(12) United States Patent
Hu

(10) Patent No.: US 9,701,099 B2
(45) Date of Patent: Jul. 11, 2017

(54) SINGLE FLEXIBLE COVER FOR TOUCH SCREEN

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 436 days.

(21) Appl. No.: 14/271,401

(22) Filed: May 6, 2014

(65) Prior Publication Data

US 2015/0324042 A1    Nov. 12, 2015

(51) Int. Cl.
| | |
|---|---|
| *B29C 65/48* | (2006.01) |
| *B29C 65/52* | (2006.01) |
| *B32B 37/12* | (2006.01) |
| *B32B 38/10* | (2006.01) |
| *B32B 38/18* | (2006.01) |
| *B32B 27/32* | (2006.01) |
| *G06F 3/041* | (2006.01) |
| *B32B 7/12* | (2006.01) |
| *B32B 27/06* | (2006.01) |
| *B32B 27/36* | (2006.01) |

(52) U.S. Cl.
CPC .......... *B32B 27/32* (2013.01); *B32B 7/12* (2013.01); *B32B 27/06* (2013.01); *B32B 27/36* (2013.01); *G06F 3/041* (2013.01); *G06F 3/0412* (2013.01); *B32B 2255/20* (2013.01); *B32B 2307/412* (2013.01); *B32B 2307/546* (2013.01); *B32B 2457/208* (2013.01); *G06F 2203/04102* (2013.01); *G06F 2203/04103* (2013.01)

(58) Field of Classification Search
USPC ............. 156/230, 231, 232, 234, 247, 249
See application file for complete search history.

(56) References Cited

U.S. PATENT DOCUMENTS

| | | | | |
|---|---|---|---|---|
| 2002/0149572 A1* | 10/2002 | Schulz | ............ | G06F 3/044 345/174 |
| 2008/0193717 A1* | 8/2008 | Jongerden | ............ | B32B 15/04 428/142 |
| 2011/0139516 A1* | 6/2011 | Nirmal | ............ | G06F 3/044 178/18.01 |
| 2012/0273256 A1* | 11/2012 | Chu | ............ | G06F 3/044 174/250 |

(Continued)

Primary Examiner — Sing P Chan
(74) Attorney, Agent, or Firm — Joe Zheng

(57) ABSTRACT

Techniques for manufacturing a single flexible cover to equip a display with touch screen capabilities are disclosed. The single flexible cover is easy to be applied to nearly all displays and maintains its durability on the displays. According to one aspect of the present invention, the single flexible cover includes at least three layers, a crystalline aluminum oxide layer, a polyethylene terephthalate (PET) film sensor stacking layer and an adhesive layer to bond the PET film sensor stacking layer to the crystalline aluminum oxide layer. The single flexible cover is produced by a manufacturing process including processes comprises: providing a foil as a substrate; coating the substrate with a set of materials including primarily aluminum oxide; curing the set of materials with heat to cause the set of materials to be crystallized to form the crystalline aluminum oxide layer; bonding the PET film sensor stacking layer to the crystalline aluminum oxide layer with optically clear adhesive (OCA); and applying anti-etching ink to top of the PET film sensor stacking layer. Then the foil and anti-etching ink are removed.

13 Claims, 7 Drawing Sheets

(56) References Cited

U.S. PATENT DOCUMENTS

| | | | | |
|---|---|---|---|---|
| 2012/0273257 A1* | 11/2012 | Chu | ............... | G06F 3/044 |
| | | | | 174/251 |
| 2012/0273262 A1* | 11/2012 | Chu | ............... | G06F 3/044 |
| | | | | 174/256 |
| 2012/0276734 A1* | 11/2012 | van Mol | ............ | H01L 51/5206 |
| | | | | 438/618 |
| 2012/0279758 A1* | 11/2012 | Chu | ............... | G06F 3/044 |
| | | | | 174/251 |
| 2012/0313873 A1* | 12/2012 | Bright | ............ | G06F 3/044 |
| | | | | 345/173 |
| 2012/0315383 A1* | 12/2012 | Bright | ............ | G06F 3/044 |
| | | | | 427/108 |
| 2013/0000829 A1* | 1/2013 | Carmi | ............ | B32B 7/06 |
| | | | | 156/230 |
| 2015/0197077 A1* | 7/2015 | Tsai | ............ | G02F 1/1333 |
| | | | | 156/249 |
| 2015/0253914 A1* | 9/2015 | Hamada | ............ | G06F 3/041 |
| | | | | 345/173 |
| 2016/0141313 A1* | 5/2016 | Yi | ............ | H01L 27/1266 |
| | | | | 438/23 |
| 2016/0315263 A1* | 10/2016 | Hartmann | ............ | B60C 1/0016 |
| 2016/0366777 A1* | 12/2016 | Rogers | ............ | C03C 17/007 |
| 2016/0369104 A1* | 12/2016 | Gu | ............ | C09D 4/06 |

\* cited by examiner

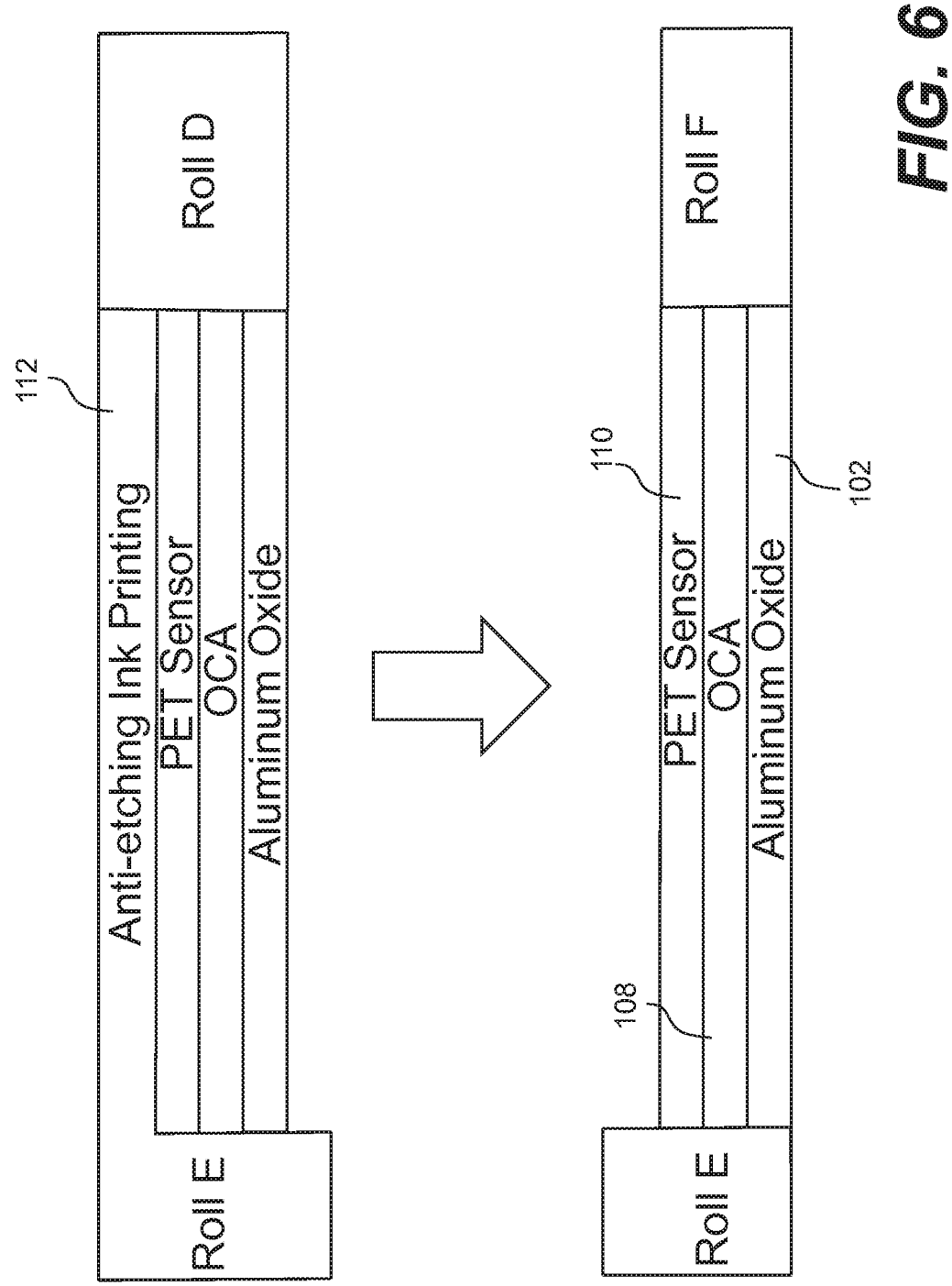

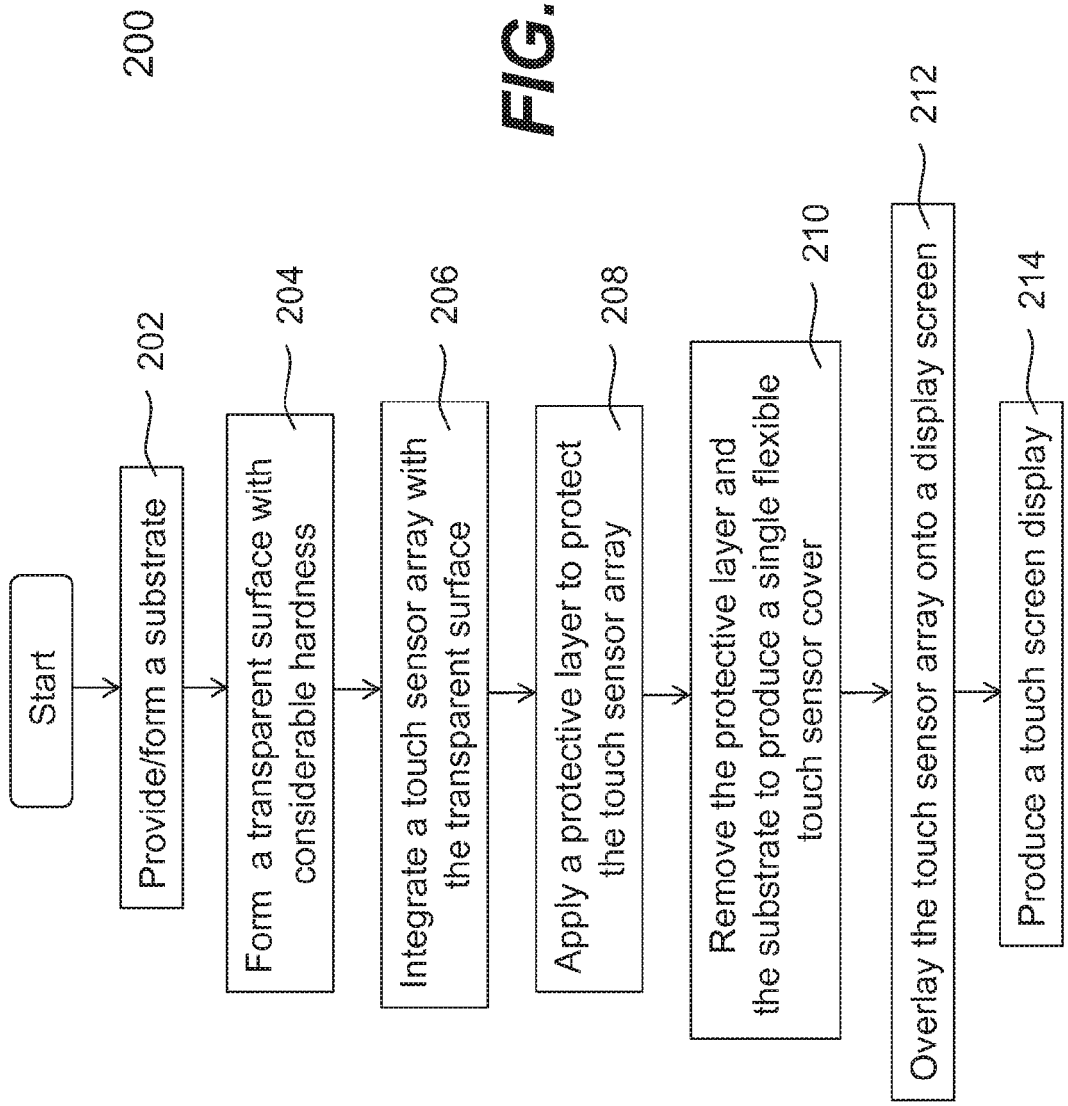

SINGLE FLEXIBLE COVER FOR TOUCH SCREEN

BACKGROUND OF THE INVENTION

Field of the Invention

The present invention is generally related to the area of display screen, and more particularly relates to techniques for manufacturing a single flexible cover to equip a display with touch screen capabilities, where the single flexible cover is easy to be applied to nearly all displays and maintains its durability on the displays.

Description of the Related Art

A touch screen display is an electronic visual display that the user can control through simple or multi-touch gestures by touching the screen with a special stylus/pen and/or one or more fingers. Some touch screens use an ordinary or specially coated glove to work while others use a special stylus/pen only. The user can use the touch screen to react to what is displayed and to control how it is displayed (for example by zooming the text size).

A touch screen display enables a user to interact directly with what is displayed, rather than using a mouse, touchpad, or any other intermediate device (other than a stylus, which is optional for most modern touch screens). Touch screens are common in devices such as game consoles, all-in-one computers, tablet computers, and smart phones. They can also be attached to computers or, as terminals, to networks. They also play a prominent role in the design of digital appliances such as personal digital assistants (PDAs), satellite navigation devices, mobile phones, video games and electronic books.

The popularity of smart phones, tablets, and many types of information appliances is driving the demand and acceptance of common touch screens for portable and functional electronics. Touch screens are found in the medical field and in heavy industry, as well as for automated teller machines (ATMs), and kiosks such as museum displays or room automation, where keyboard and mouse systems do not allow a suitably intuitive, rapid, or accurate interaction by the user with the display's content.

Historically, the touch screen sensor and its accompanying controller-based firmware have been made available by a wide array of after-market system integrators, and not by display, chip, or motherboard manufacturers. Display manufacturers and chip manufacturers worldwide have acknowledged the trend toward acceptance of touch screens as a highly desirable user interface component and have begun to integrate touch screens into the fundamental design of their products.

There are a variety of touch screen technologies that have different methods of sensing touch. Regardless of what technology is being used, the process of manufacturing touch screens is complicated and expensive. Thus there is a need for simplified manufacturing process of making touch screen displays or solutions that can equip any displays with touch screen capability.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to techniques for manufacturing a single flexible cover to equip a display with touch screen capabilities, where the single flexible cover is easy to be applied to nearly all displays and maintains its durability on the displays. According to one aspect of the present invention, the single flexible cover includes at least three layers, a crystalline aluminum oxide layer, a polyethylene terephthalate (PET) film sensor stacking layer and an adhesive layer to bond the PET film sensor stacking layer to the crystalline aluminum oxide layer. The single flexible cover is produced by a manufacturing process including processes comprises: providing a foil as a substrate; coating the substrate with a set of materials including primarily aluminum oxide; curing the set of materials with heat to cause the set of materials to be crystallized to form the crystalline aluminum oxide layer; bonding the PET film sensor stacking layer to the crystalline aluminum oxide layer with optically clear adhesive (OCA); and applying anti-etching ink to top of the PET film sensor stacking layer. Then the foil and anti-etching ink are removed.

The present invention may be implemented as an apparatus or a part of system. According to one embodiment, the present invention is a method for producing a touch screen display, the method comprises: forming a transparent layer on a substrate, wherein the transparent layer is flexible and has considerable hardness on surface, integrating the transparent layer with a touch sensor array; and applying a protective layer to protect the touch sensor array to form a stacked setting A. The method as recited in claim 1, further comprises: removing the substrate from the stacked setting A to form a stacked setting B; and removing the protective layer from the stacked setting B to form the single flexible cover. Once the single flexible cover is applied to a display screen, such as an LCD screen, a CRT screen and an OLED screen, the display screen is turned into a touch screen display.

According to one embodiment, the present invention is a touch screen display the comprises a display, and a single flexible cover bonded to the display to turn the display to a touch screen display, wherein the single flexible cover is transparent and includes at least three layers, a crystalline aluminum oxide layer, a polyethylene terephthalate (PET) film sensor stacking layer and an adhesive layer to bond the PET film sensor stacking layer to the crystalline aluminum oxide layer, wherein the single flexible cover is produced by a manufacturing process including processes comprises: providing a foil as a substrate; coating the substrate with a set of materials including primarily aluminum oxide; curing the set of materials with heat to cause the set of materials to be crystallized to form the crystalline aluminum oxide layer; bonding the PET film sensor stacking layer to the crystalline aluminum oxide layer with optically clear adhesive (OCA); and applying anti-etching ink to top of the PET film sensor stacking layer. Then the foil and anti-etching ink are respectively removed.

One of the features, benefits and advantages in the present invention is to provide a manufacturing process to produce single flexible covers that can easily turn regular displays to touch screen displays.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 6 shows a next process of removing the protective layer;

FIG. 7A shows a flowchart or process of producing a touch screen display; and

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
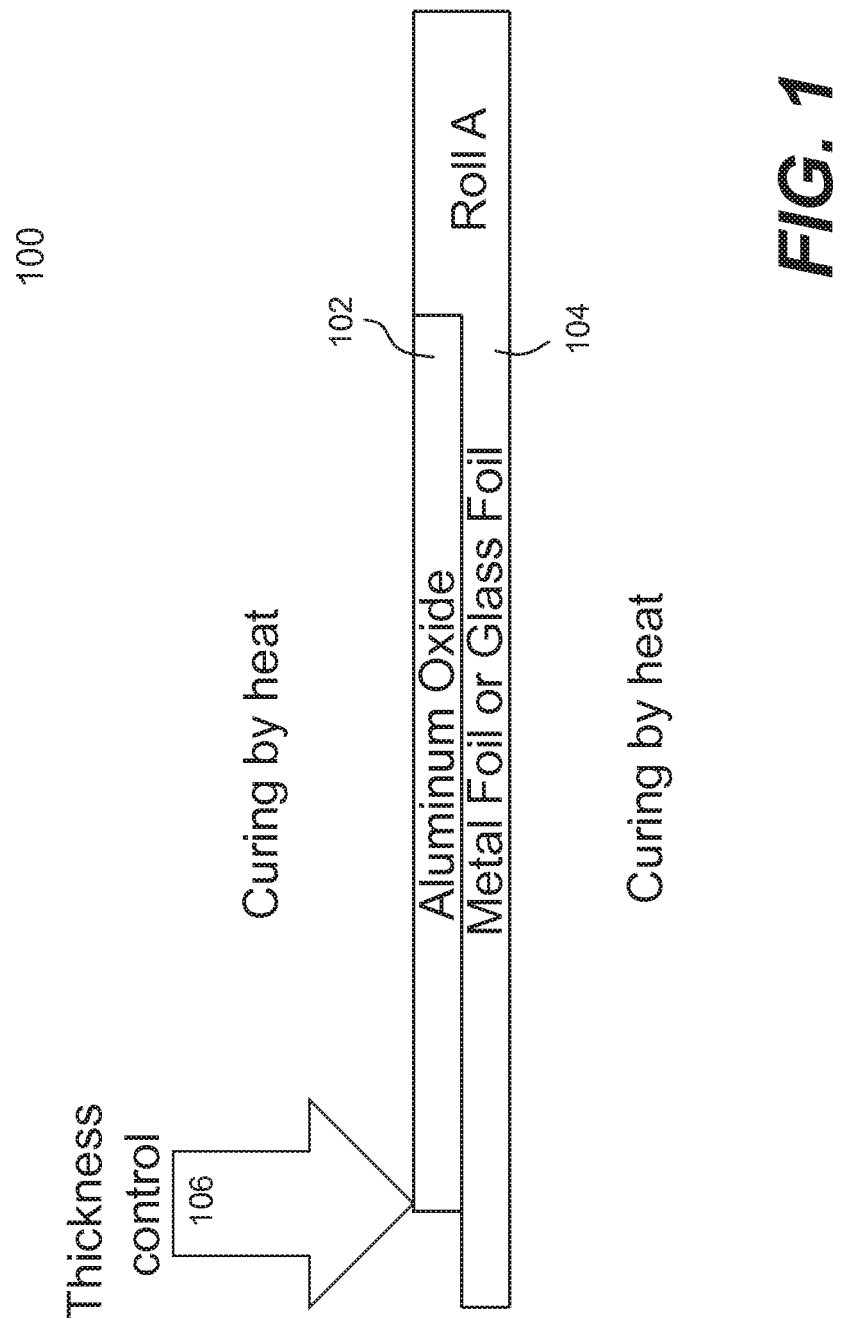
FIG. 1 shows a graphic illustration of a layer of aluminum oxide being formed on top of a metal foil, a glass foil or a substrate.

Referring now to the drawings, in which like numerals refer to like parts throughout the several views, FIG. 1 shows a graphic illustration 100 of a layer of aluminum oxide 102 being formed on top of a metal foil or a substrate 104. Aluminum oxide is a chemical compound of aluminum and oxygen with the chemical formula $Al_2O_3$. It is the most commonly occurring of several aluminum oxides, and specifically identified as aluminum(III) oxide. It is commonly called alumina, and may also be called aloxide, aloxite, or alundum depending on particular forms or applications. It commonly occurs in its crystalline polymorphic phase $\alpha$-$Al_2O_3$, in which it comprises the mineral corundum, varieties of which form the precious gems ruby and sapphire. $Al_2O_3$ is significant in its use to produce aluminum metal, as an abrasive owing to its hardness, and as a refractory material owing to its high melting point.

According to one embodiment, the original form of aluminum oxide is in nanoparticles. To form such a layer of aluminum oxide, a substrate is needed. In one embodiment, the substrate is a metal foil. Thus the aluminum oxide in nanoparticles mixed with other material (e.g., water or Titanium Dioxide—Titania or $TiO_2$) is spread onto the foil 104 to form a sheet referred to herein as Roll A.

In nanotechnology, a particle is defined as a small object that behaves as a whole unit with respect to its transport and properties. Particles are further classified according to diameter. Coarse particles cover a range between 2,500 and 10,000 nanometers. Fine particles are sized between 100 and 2,500 nanometers. Ultrafine particles, or nanoparticles, are between 1 and 100 nanometers in size. With a proper method, the thickness of the layer of aluminum oxide 102 can be controlled by a control means 106. To maintain its transparency, the layer of aluminum oxide 102 is typically controlled in a few nanometers in thickness.

The sheet Roll A is then cured by heat (e.g., 450° C.) to cause the aluminum oxide to be crystallized, hence crystalline aluminum oxide that enhance of its hardness of the aluminum oxide layer 102. In other words, with sapphire ($Al_2O_3$) nanoparticle material and TiO2 material as coating being sprayed and cured at high temperature to be crystallized, a thin layer with considerable hardness is formed one the surface of metal foil or glass foil 104.

Figure 2:
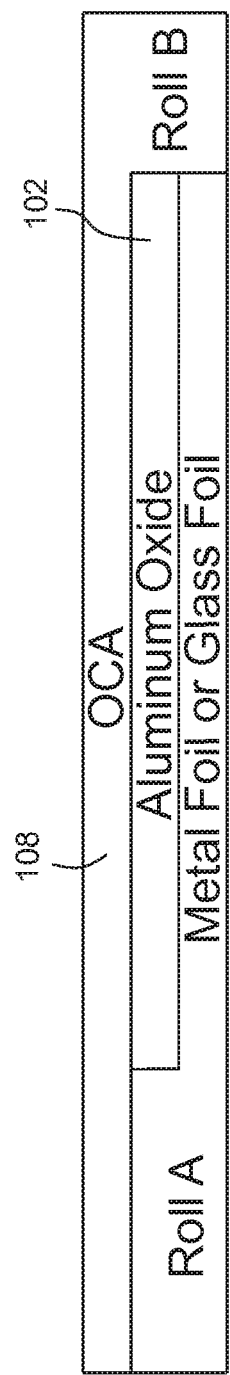
FIG. 2 shows Roll A is coated with a layer of optical clear adhesive, specifically, a layer of OCA is coated on top of the crystalline aluminum oxide layer.

Referring now to FIG. 2, it shows Roll A is coated with a layer 108 of optical clear adhesive (OCA). Specifically, the layer 108 of OCA is coated on top of the crystalline aluminum oxide 102. OCA is a liquid-based bonding adhesive used to bind cover lens, plastic or other optical materials. Such adhesives have the characteristics of improving optical characteristics of a device as well as other attributes such as durability.

Figure 3:
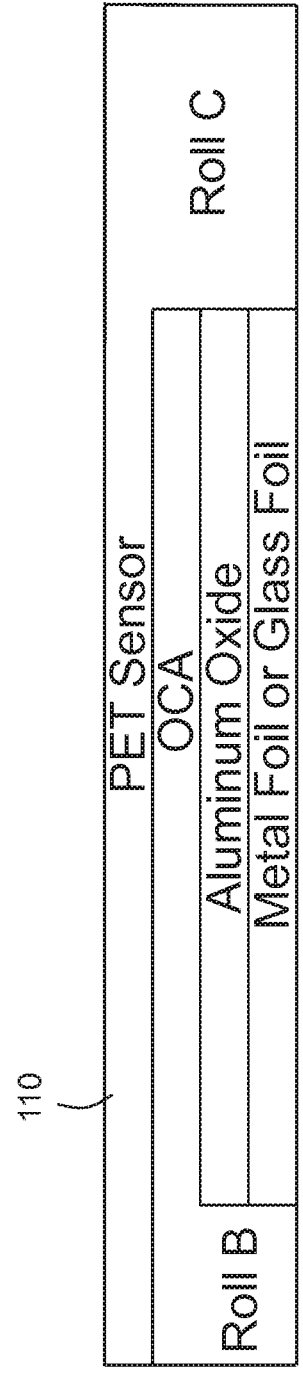
FIG. 3 shows that a sheet of polyethylene terephthalate (PET) film sensor stacking is bonded to the aluminum oxide layer by the optical clear adhesive.

FIG. 3 shows that a sheet of polyethylene terephthalate (PET) film sensor stacking 110 is bonded to the aluminum oxide layer 102 by the optical clear adhesive 108. According to one embodiment, the polyethylene terephthalate (PET) film sensor stacking 110 is constructed with at least 2 sheets of material separated slightly by spacers. An exemplary construction of the embodiment uses a sheet of substrate providing a stable bottom layer and a sheet of polyethylene terephthalate (PET) as a flexible top layer. As used herein, the film sensor stacking 110 is referred to as a sheet or a layer as a whole. Those skilled in the art shall understand that the film sensor stacking 110 shall have at least two layers in structure.

In one embodiment, the two sheets are coated with a resistive substance, usually a metal compound called Indium Tin Oxide (ITO). The ITO is thinly and uniformly sputtered onto both the substrate and the PET layer. Tiny bumps called spacer dots are then added to the substrate side, on top of the resistive ITO coating, to keep the PET film from sagging, causing an accidental or false touch. When the PET film is pressed down, the two resistive surfaces meet. The position of this meeting (a touch) can be read by a touch screen controller circuit (not shown).

Figure 4:
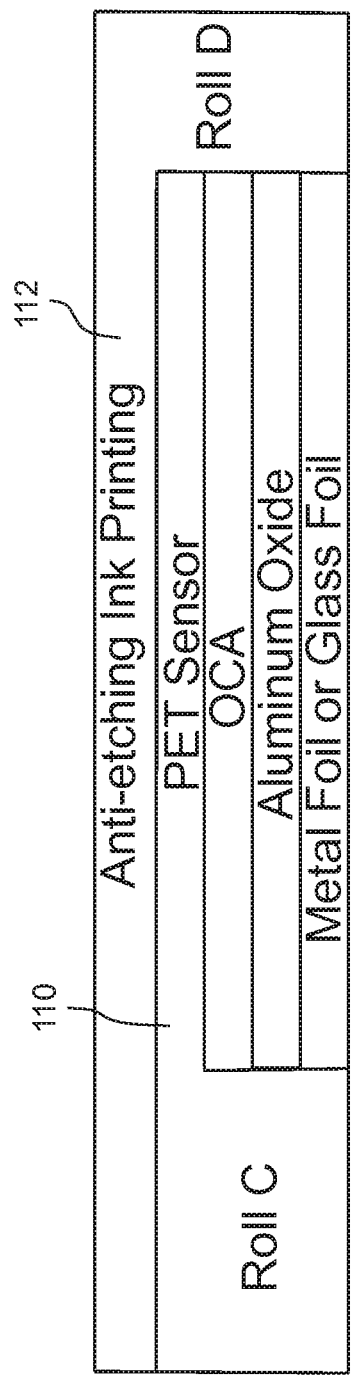
FIG. 4 shows that a protective layer is disposed on top of a polyethylene terephthalate (PET) film sensor stacking to protect the PET film sensor stacking when the stacked layers referred herein as Roll D is further processed.

Referring now to FIG. 4, a protective layer 112 is printed on top of the polyethylene terephthalate (PET) film sensor stacking 110. The protective layer 112 is to protect the polyethylene terephthalate (PET) film sensor stacking 110 when the stacked layers referred herein as Roll D is further processed.

According to one embodiment, the protective layer 112 is formed by using anti-etching ink to print or spray onto the polyethylene terephthalate (PET) film sensor stacking 110. With the protective layer 112, Roll D can be progressed to remove the substrate layer as shown in FIG. 5.

Figure 5:
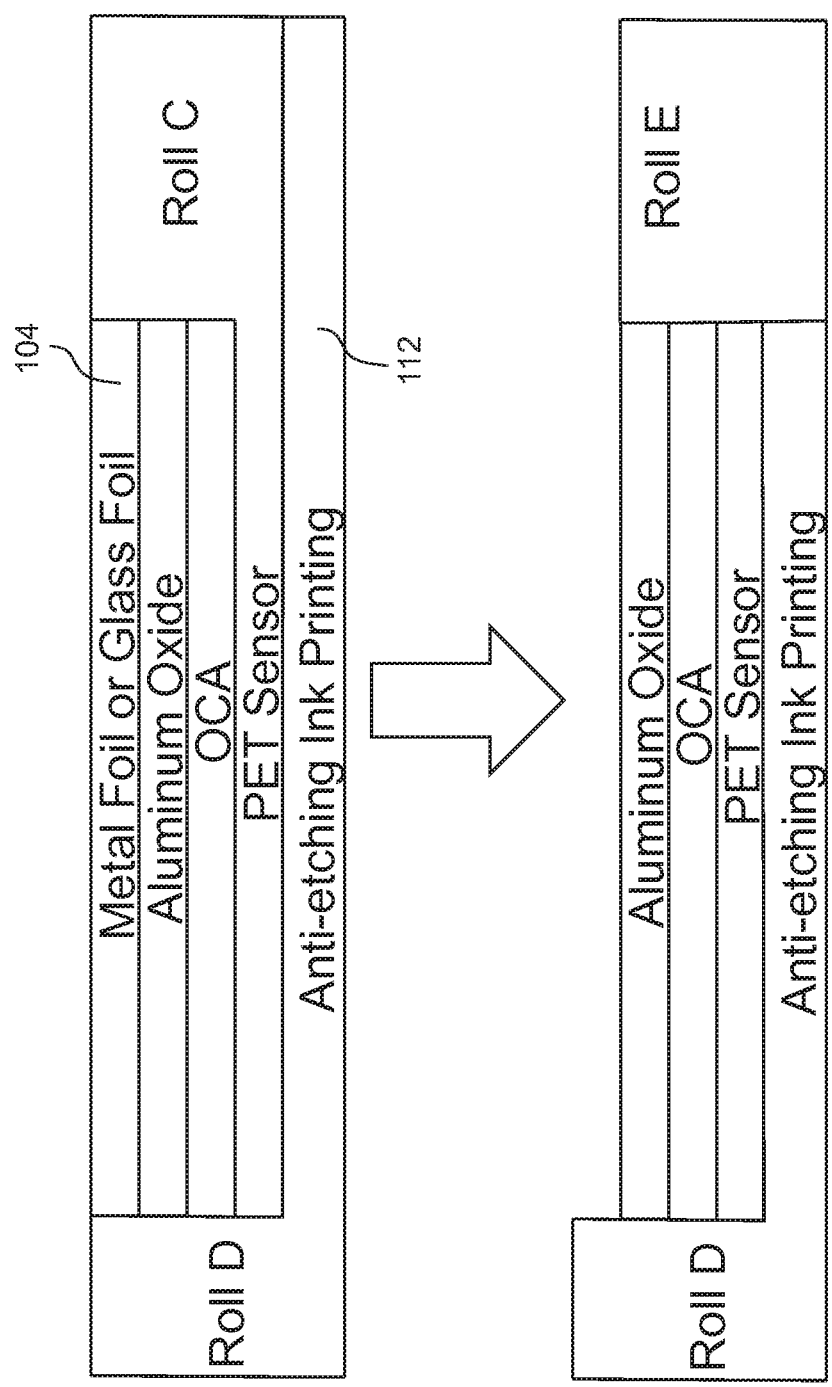
FIG. 5 shows that Roll D is processed to remove the substrate layer.

FIG. 5 shows that Roll D is processed to remove the substrate layer 104. In one embodiment, the substrate is a metal foil or glass foil. In one embodiment, a sanding approach is applied to remove the substrate layer 104, resulting in a new stacked layer Roll E. In another embodiment, an etching approach is applied to remove the substrate layer 104, resulting in a new stacked layer Roll E.

FIG. 6 shows a next process of removing the protective layer 112 from Roll E. In one embodiment, the protective layer is anti-etching ink. A type of chemical is applied to remove the anti-etching ink, resulting in Roll F. As shown FIG. 6, Roll F now includes three layers, the aluminum oxide layer 102, the OCA layer 108 and the EPT layer 110.

FIG. 7A shows a flowchart or process 200 of producing a touch screen display. The process 200 may be understood in conjunction with FIGS. 1-6 and implemented independently or as part of manufacturing process. At 702, a substrate is provided or formed. The substrate is provided to form a transparent layer with sufficient hardness to withstand wearing primarily caused by repeated touches or scratches caused by other objects. As described above in one embodiment, the substrate is a metal foil.

At 204, a transparent layer with sufficient hardness is formed. As described above in one embodiment, the primary material that is used to form such a transparent layer is aluminum oxide in nanoparticles mixed with water or other chemicals or materials. The nanoparticles are spread onto the substrate with a predefined thickness. The substrate with the nanoparticles is then cured with heat to cause the nanoparticles to be crystallized, hence a layer of crystalline aluminum oxide. This layer of crystalline aluminum oxide would be transparent and flexible without the substrate. But for now, there is the substrate. The two layers of the substrate and the transparent layer are referred to as Roll A.

At 206, a touch sensor array is integrated with Roll A. The touch sensor array in form of sheet may be obtained from 3M (www.3M.com) or Nitto (www.nittousa.com). It shall be noted that the touch sensor array is described herein as a sheet or layer as a whole. Those skilled in the art shall understand that the touch sensor array includes multiple layers in structure depending on implementation. The touch sensor array that may be used in the present invention is not limited to polyethylene terephthalate (PET) film sensor stacking. It may include grapheme-based touch sensors, or touch sensors based on transparent conductive material using silver or copper nanowires. Depending on the touch sensor array, some come with one side coated with optically clear adhesive while others have to be coated with optically clear adhesive. In the later case, Roll A is coated with the optically clear adhesive to become Roll B before the touch sensor array is laid over onto Roll B. In any case, after the touch sensor array is integrated with Roll A, the stacked layers are now referred to as Roll C.

At 208, a protective layer is applied to Roll C to protect the touch sensor array when the substrate layer provided or formed at 202 is removed. Depending on how the substrate layer is removed, the characteristics of the protective layer are properly chosen. In one embodiment, a type of anti-etching ink is used to print onto or cover the touch sensor array to form Roll D.

At 210, the substrate layer provided or formed at 202 is first removed. Depending on the nature of the substrate layer, there are ways to remove it from Roll D. According to one embodiment, the substrate layer is removed by a type of chemical solution, where the anti-etching ink is resistant to the chemical solution. Once the substrate layer is removed, the anti-etching ink is removed (e.g., washed away). The stacked layers or Roll F now include the aluminum oxide layer, an adhesive layer and a touch sensor array layer.

At 212, Roll F may be applied onto a display screen to turn the display screen into a touch screen display, either in manufacturing or after-market. One of the important features of Roll F is that the stacked layers are a single integrated flexible touch screen cover with sufficient hardness to withstand normal scratches and wearing. The flexible touch screen cover makes the manufacturing of touch screen displays much easier than the traditional approaches.

Figure 7B:
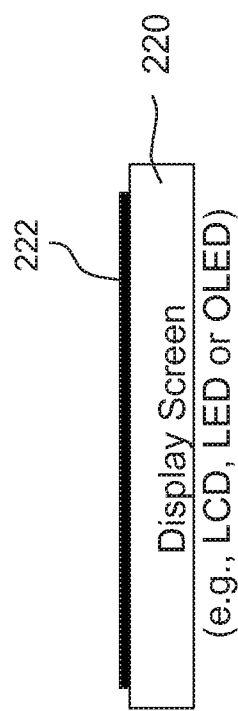
FIG. 7B shows an exemplary of turning a regular display into a touch screen display by simply overlaying the touch screen cover onto the regular display.
Figure 7C:
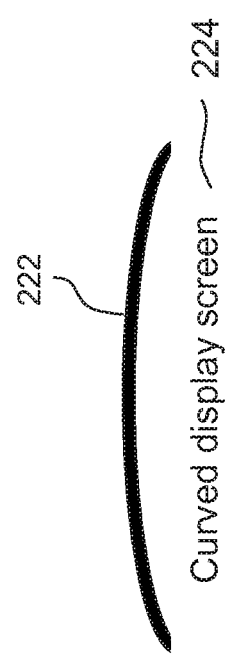
FIG. 7C shows an example of turning a curved display into a touch screen display by simply bending and overlaying the touch screen cover 220 onto the curved display.

FIG. 7B shows an exemplary of turning a regular display 222 into a touch screen display by simply overlaying the touch screen cover 220 onto the regular display 222 (e.g., an LCD display, a CRT display or an OLED display). Because the touch screen cover in the present invention is flexible, it can be readily applied to any shape of displays. FIG. 7C shows an example of turning a sphere-shaped display 222 into a touch screen display by simply bending and overlaying the touch screen cover 220 onto the sphere-shaped display 222 (e.g., an LCD display, a CRT display or an OLED display).

The present invention has been described in sufficient detail with a Phosphorus certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A method for producing a touch screen display, the method comprising:
    forming a transparent layer on a substrate, wherein the transparent layer is flexible and has a hard surface;
    integrating the transparent layer with a touch sensor array;
    applying a protective layer to protect the touch sensor array to form a first stacked setting;
    removing the substrate from the first stacked setting to form a second stacked setting; and
    removing the protective layer from the stacked second setting to form a single flexible cover.

2. The method as recited in claim 1, further comprising:
    applying the single flexible cover to a display screen to turn the display screen into the touch screen display.

3. The method as recited in claim 2, wherein said integrating the transparent layer with a touch sensor array comprises:
    coating on the transparent layer a layer of adhesive; and
    applying the adhesive layer to the touch sensor array to be integrated with the transparent layer.

4. The method as recited in claim 3, wherein the adhesive is optically clear adhesive (OCA).

5. The method as recited in claim 1, wherein the transparent layer is formed by operations including:
    coating the substrate with a set of materials including primarily aluminum oxide; and
    curing the set of materials with heat to cause the set of materials to be crystallized.

6. The method as recited in claim 5, wherein the heat is close to or at least 450° C. to cause the set of materials to be crystallized to form crystalline aluminum oxide.

7. The method as recited in claim 6, wherein the touch sensor array is a sheet of polyethylene terephthalate (PET) film sensor stacking.

8. The method as recited in claim 1, wherein the protective layer is a material resistant to chemicals used to remove the substrate from the first stacked setting.

9. The method as recited in claim 8, wherein the substrate is a type of foil, and the protective layer is anti-etching ink coated or printed onto the touch sensor array.

10. The method as recited in claim 9, wherein said removing the protective layer from the second stacked setting to form a single flexible cover comprises: washing out the anti-etching ink from the touch sensor array.

11. A method for producing a touch screen display, the method comprising:
    obtaining a single flexible cover for touch screen, wherein the single flexible cover includes at least three layers, a crystalline aluminum oxide layer, a polyethylene terephthalate (PET) film sensor stacking layer and an adhesive layer to bond the PET film sensor stacking layer to the crystalline aluminum oxide layer; and
    applying the single flexible cover onto a display to turn the display to a touch screen display.

12. The method as recited in claim 11, wherein the single flexible cover is produced by a manufacturing process including operations of:
    providing a foil as a substrate;
    coating the substrate with a set of materials including primarily aluminum oxide;
    curing the set of materials with heat to cause the set of materials to be crystallized to form the crystalline aluminum oxide layer;
    bonding the PET film sensor stacking layer to the crystalline aluminum oxide layer with optically clear adhesive (OCA); and
    applying anti-etching ink to top of the PET film sensor stacking layer.

13. The method as recited in claim 12, wherein the processes further comprise:
    removing the substrate; and
    removing the anti-etching ink to produce the single flexible cover.

* * * * *